Aug. 17, 1965          W. H. MITCHELL          3,200,584
                      SHEAR SLIDE CUSHION

Filed June 26, 1961                     2 Sheets-Sheet 1

INVENTOR.
WILLIAM H. MITCHELL
BY
AGENT

INVENTOR.
WILLIAM H. MITCHELL

United States Patent Office 3,200,584
Patented Aug. 17, 1965

3,200,584
SHEAR SLIDE CUSHION
William H. Mitchell, Randolph Township, N.J., assignor to Thiokol Chemical Corporation, Bristol, Pa., a corporation of Delaware
Filed June 26, 1961, Ser. No. 123,923
2 Claims. (Cl. 60—35.6)

This invention relates generally to rocket powerplants and more particularly to a cushioning device for relatively moveable parts thereof.

An important problem encountered in rocket powered missile operation is the fact that many components (guidance system, etc.) are sensitive to shock loads caused by rough handling, rocket engine ignition, or rapid operation of valve-type and other components.

One type of rocket powerplant, which is storable for an indefinite period pending its use, is the packaged liquid rocket engine which embodies propellant tanks communicating with the engine combustion chamber by means of propellant ports. The ports are sealed by rupturable cups supported in aligned recesses formed in a shear slide, shearing movement thereof being prevented by a retaining pin shearable by a given gas pressure when the rocket is ignited or fired so as to effect rupture of the cups and align the tank ports and conforming shear slide ports to admit propellant to the combustion chamber.

The slide moves from an initial position in which it is retained by the shear pin to the final position in which the tank ports and slide ports are aligned and is arrested there by the engagement of a slide shoulder with a shoulder on the inner face of the combustion chamber wall or header. Rough handling such as dropping of the rocket engine, or the predetermined gas pressure produced by ignition of the powerplant to effect movement of the slide and impart a high velocity thereto is accompanied by a severe shock upon the arresting of the slide by the header shoulder. This may damage the engine and its parts, seriously impair performance of the engine, and disturb sensitive guidance equipment in the associated vehicle. One example of such damage to relatively movable parts of the engine is the failure of a shoulder so that the slide is not arrested as designed but overruns the position of proper propellant port alignment.

Accordingly, the main object of the present invention is to provide a cushioning device for relatively movable parts which are sensitive to shock resulting from the arresting of the movement, the device effectively absorbing the energy of the movement to substantially reduce or eliminate the shock.

An important object of the present invention is to provide a cushioning device for a pair of members which are relatively movable from an initial to a final position whereupon motion is abruptly arrested without damaging shock whether the motion is effected intentionally or accidentally as by dropping of the members.

Another important object of the present invention is to provide a rocket powerplant having a slide movable within the engine combustion chamber from an initial to a final position at which it is arrested, and having cushioning means so arranged and positioned as to materially reduce the shock of the arresting of the slide to protect both the motor parts and equipment associated with the vehicle.

A further important object of the present invention is to provide a novel cushioning device for arresting the slide of a rocket engine after a predetermined movement from an initial to a final position, the device being installed under compression to eliminate acidental movement of the slide by rough handling such as the dropping of the rocket engine.

Other objects and advantages of the invention will become apparent during the course of the following description.

In the drawings, I have shown four embodiments of the invention. In these showings:

In its broadest aspects the present invention contemplates a novel composite cushioning device and its combination with a pair of members which are relatively movable from an initial to a final position, the abrupt arresting of the movement of the members which is otherwise accompanied by damaging shock being effectively prevented by the action of the composite cushioning device due to the nature of its materials and design.

Figure 1:
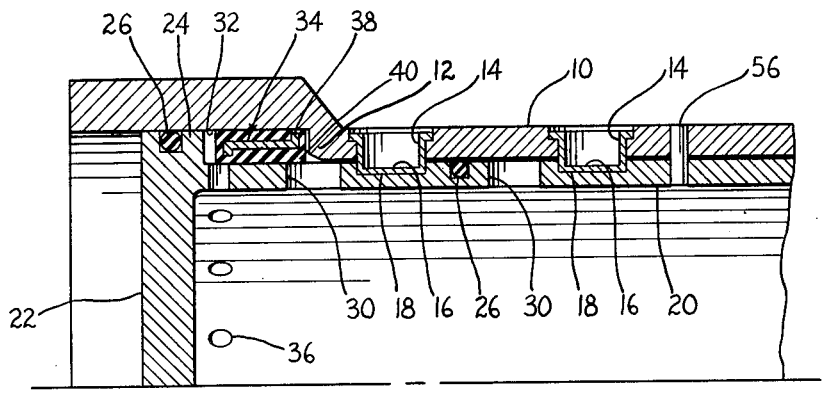
FIGURE 1 is a fragmentary, central, longitudinal sectional view of one form of the invention showing the shear slide of a rocket engine in its initial or prefiring position.

Referring to FIGURE 1 of the drawings, numeral 10 designates the combustion chamber wall or header of a rocket engine, the header having an inner, annular shoulder 12 and spaced propellant inlet ports 14 sealed by shear cups 16 supported by and mounted in recesses 18 of a shear slide 20 having a head 22 including a peripheral shoulder 24. The shear slide 20 has a close sliding fit within the combustion chamber wall 10 and is provided with suitable O-ring seals 26.

The slide 20 moves to the right from the initial, prefiring position shown under the pressure of generated gases acting on the slide head 22 and is normally arrested by the contacting of the slide shoulder 24 with the header shoulder 12 where no cushion is provided. Using the cushion of the present invention, the two shoulders function to arrest the slide but do not contact one another due to the interposed cushion in the final slide position. The slide design is such that in the final or fired position, the spaced slide ports 30 are in alignment with the propellant inlet ports 14.

In the initial position of the slide 20 in which it is held by a shear pin 56 as shown in each figure of the drawings, the shoulders 24 and 12, the header 10 and the slide 20 all co-operate to define an annular cushioning chamber 32 in which one form 34 of the composite cushion ring comprising an important part of the present invention is placed. Communication is provided between the cushioning chamber 32 and the interior of the slide 20 by means of a plurality of circumferentially spaced apertures 36 formed in the periphery of the slide 20 adjacent the base of the slide shoulder 24.

The composite cushion 34 embodies a plurality of elements and in this form comprises a metal ring 38 having upturned and down-turned edge flanges to prevent its becoming jammed between the slide 20 and the header 10, and a plastic-like compound 40 in which the metal ring 38 is potted. The plastic compound 40 should be low in shear strength and have a small change in hardness over the temperature range −40° F. to +200° F. This requirement is met by either the Dow Chemical Company's "Silicone RTV501" or General Electric Company's "Silicone RTV60," with or without micro balloon filler.

In operation of the form of the invention disclosed in FIGURE 1, ignition of the rocket engine forces the shear slide 20 to the right as explained. While the crushing and the deforming of the metal band 38 functions as a cushion, further reduction in the shock level is obtained by the use of the potting plastic 40 which upon the movement and the pressure of the slide 20 to the right, is forcibly expelled through the apertures 36 in a shearing manner. The slide 20 then comes to rest in the final position with the deformed metal band 38 between its shoulder 24 and the shoulder 12 of the header 10, the shock of the arresting movement thus being efficiently and gradually cushioned by the composite cushion 34 without a bouncing effect.

Figure 2:
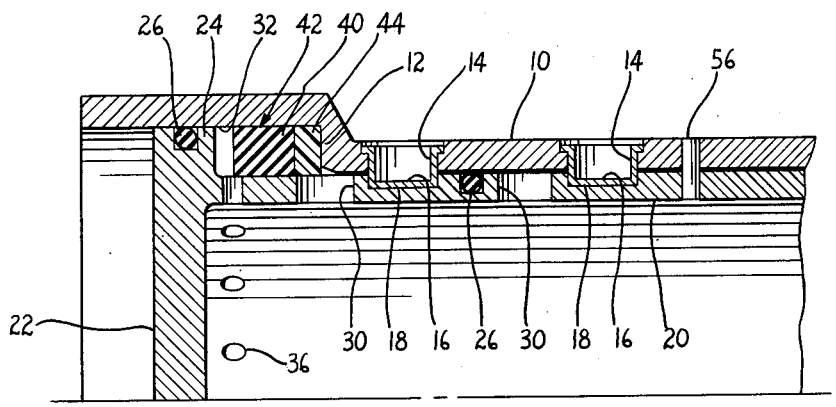
FIGURE 2 is a similar view of another form of the invention.

In the form of the invention shown in FIGURE 2, the elements of the composite cushion 42 comprise the plastic 40 and a secondary cushion 44 formed of material having low transmissibility characteristics such as polytetrafluoroethylene ("Teflon") or lead. This secondary cushion, as in the case of the metal ring 38 of FIGURE 1, prevents contact of the shear slide shoulder 24 with the header shoulder 12 after the plastic 44 has been expelled through the apertures 36. If the secondary cushion 44 is of "Teflon" rather than lead, it also seals the apertures 36.

Figure 3:
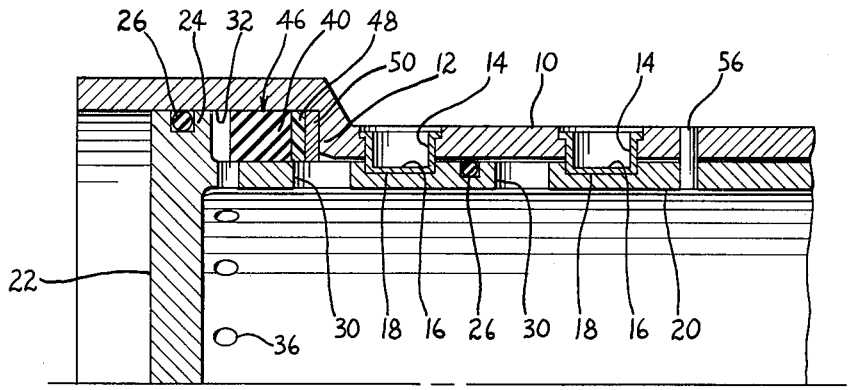
FIGURE 3 is a similar view of a further form of the invention.

In the form of the invention disclosed in FIGURE 3, the composite cushion 46 comprises the plastic 40, and a secondary cushion element comprised of "Teflon" 48 and a lead element 50. Upon movement of the slide 20 from the initial to the final position, the initial cushioning is effected (as in the case of FIGURE 2) by the expulsion of the plastic 40 through the apertures 36 as well as by the "Teflon" 48 and the lead 50. It is to be noted that the "Teflon" cushion 48 again seals the apertures 36 after the expulsion of the plastic cushion 40 so that the lead cushion 50 is prevented from flowing through the apertures if it should melt.

As disclosed in FIGURES 1-3 inclusive, the composite cushions do not occupy the full volume of the cushioning chamber 32 so that the volume adjacent the apertures 36 permits some movement of the slide 20 from its initial position before the cushioning action commences. In the event that drop tests, to ensure safety in routine handling, are required of the rocket engine, the dimensions of the composite cushion can be such that it must be installed and retained under compression in the cushioning chamber 32.

Figure 4:
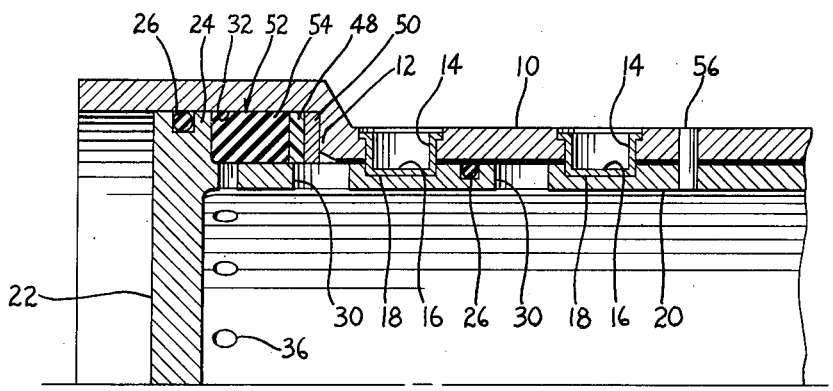
FIGURE 4 is a view similar to FIGURE 3 but wherein the cushioning device is of increased dimensions and assembled under compression.

As seen in FIGURE 4, the composite cushion 52 is identical to the composite cushion 46 of FIGURE 3 except that the dimensions of the plastic 54 have been increased so that the dimensions of the composite cushion 52 slightly exceed those of the cushioning chamber 32. The composite cushion 52 is now put under compression by the slide 20 which is maintained thusly in its initial position by a shear pin 56. Tests have determined that this assembly of the rocket engine will withstand drop tests of at least forty feet in the nozzle down attitude.

It will now be readily apparent that the present invention comprises an efficient shock absorber which will effectively reduce or eliminate ignition shock and permit rough handling of the engine due to the nature of the composite cushion and the preventing of the contacting of the slide and header shoulders.

It is to be understood that the forms of the invention herewith shown and described are to be taken as preferred examples of the same and that various changes in the shape, size and arrangement of parts may be resorted to without departure from the spirit of the invention or the scope of the subjoined claims.

What is claimed is:

1. A cushioning device for a rocket engine having a combustion chamber and a shear slide movable therewithin from an initial to a final position only comprising, in combination, a first shoulder formed on the wall of the combustion chamber, a second shoulder formed on the shear slide and being spaced from said first shoulder in the initial position and in substantial but not actual contact therewith in the final position, the wall of the combustion chamber defining a cushioning chamber with the slide and said shoulders, a plurality of orifices formed in said slide adjacent said second shoulder and communicating with said cushioning chamber, and a composite cushion having a plurality of elements positioned in said cushioning chamber to simultaneously absorb the shock of and prevent actual contact of said second shoulder with said first shoulder on movement of the slide to final position, one of said elements comprising a plastic expellable through said orifices during said movement and two other of said elements being of materials of low shock transmissibility characteristics, one of said materials being lead and the other being interposed between said plastic and said lead to seal the orifices to prevent expulsion therethrough of said lead.

2. The combination recited in claim 1 wherein said composite cushion is maintained under compression in said cushioning chamber in the initial position of said slide.

References Cited by the Examiner

UNITED STATES PATENTS

| | | | |
|---|---|---|---|
| 2,724,463 | 11/55 | Becker | 188—1 |
| 2,966,200 | 12/60 | Fredhold | 188—1 |
| 2,997,325 | 8/61 | Peterson | 188—1 |
| 2,998,214 | 8/61 | Peterman | 188—1 |
| 3,094,837 | 6/63 | Sherman et al. | 60—39.48 X |

SAMUEL LEVINE, *Primary Examiner.*

SAMUEL FEINBERG, ABRAM BLUM, *Examiners.*